H. W. MAURER.
ANTISKIDDING DEVICE.
APPLICATION FILED AUG. 30, 1911.
1,049,751.
Patented Jan. 7, 1913.
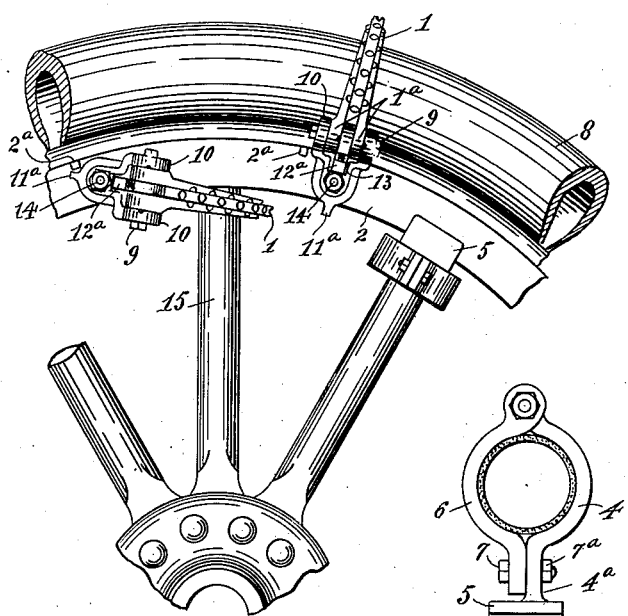
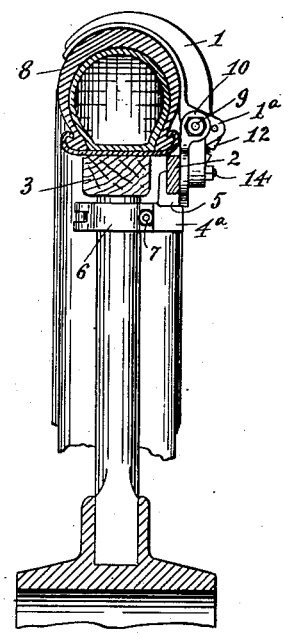
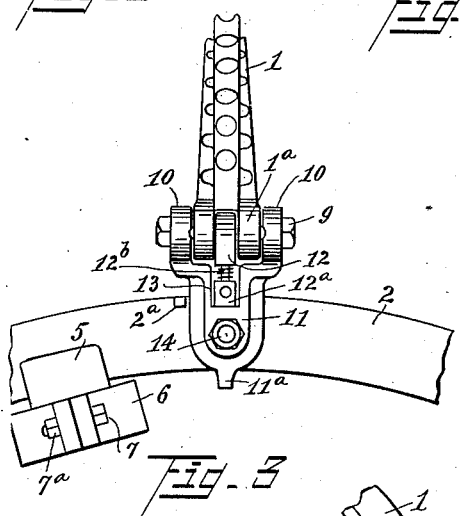
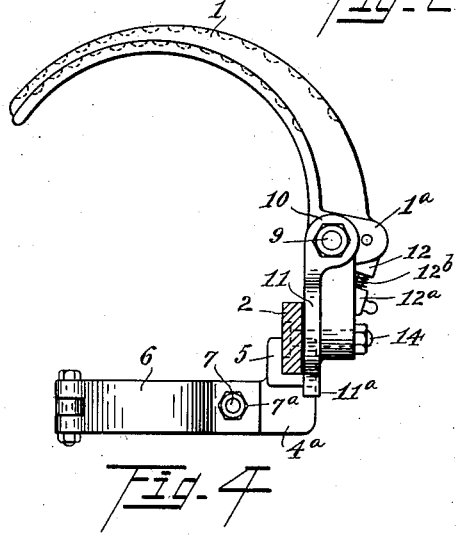
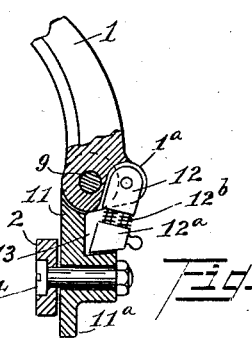
Witnesses:
F. Griswold
E. P. Schlosser
Inventor
H. W. Maurer
by Fred S. Hillman
Attorney

UNITED STATES PATENT OFFICE.

HERMAN W. MAURER, OF CLEVELAND, OHIO, ASSIGNOR OF ONE-HALF TO HOWARD E. MILLS, JR., OF CLEVELAND, OHIO.

ANTISKIDDING DEVICE.

1,049,751. Specification of Letters Patent. Patented Jan. 7, 1913.

Application filed August 30, 1911. Serial No. 646,853.

*To all whom it may concern:*

Be it known that I, HERMAN W. MAURER, a citizen of the United States, residing at Cleveland, in the county of Cuyahoga and State of Ohio, have invented certain new and useful Improvements in Antiskidding Devices, of which the following is a specification.

My invention relates to improvements in anti-skidding devices for wheel tires, and is particularly designed and adapted for use as an anti-skidding or traction device for use in connection with pneumatic tires used in connection with the wheels of automobiles and other horseless vehicles.

The primary object of my invention is to provide a generally improved anti-skidding device of simple, cheap, and efficient construction which may be readily and quickly attached to or detached from any ordinary wheel and pneumatic tire.

With the above-mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a side elevation of a section of a wheel and tire equipped with the improved anti-skidding device, one of the tire traction members being shown in a folded position. Fig. 2, a cross sectional view of the same. Fig. 3, an enlarged edge view of one of the tire traction members, and illustrating a portion of the supporting ring, and one of the spoke clamps. Fig. 4, a side elevation of the tire traction member and spoke clamp, the supporting ring being shown in cross section. Fig. 5, a plan view of the spoke clamp detached. Fig. 6, a fragmentary view of the pivoted portion of one of the tire traction members and illustrating a locking or latching member for holding the tire traction member in operative position or contact with the tire.

Similar numerals of reference designate like parts throughout all the figures of the drawings.

The improved anti-skidding device comprises a plurality of tire traction members 1, of circular or crescent shape and adapted to be secured or mounted at one side of the tire and to extend transversely over the tread portion thereof when in operative position for use.

As a means for quickly attaching or detaching the tire traction members to the wheel, a supporting ring 2, may be provided at one side of the wheel felly 3, said supporting ring, in the present instance, being secured and supported by means of a plurality of spoke clamps 4, arranged at suitable intervals, each of said spoke clamps consisting of a fixed member carrying a supporting lug 5, and a hinged or movable clamp member 6, the free end of said hinged clamp member being adapted to be secured by means of a securing bolt 7, passing through the shank or lug supporting portion $4^a$, of the clamp, and provided with a nut $7^a$. The lug 5, of the spoke clamp is provided with a recess adapted to receive and take over the inner marginal edge of the supporting ring, whereby the latter is securely held in proper position for supporting the tire traction members 1.

As a means for swinging the tire traction members into and out of operative engagement with the tread portion of the tire 8, the tire traction members are pivotally mounted or hinged at one side of the tire by means of pivot bolts 9, mounted in bearing lugs 10, of supporting members or clips 11, carried or supported, in the present instance, on the supporting ring 2.

As a means for holding the tire traction members 1, in operative contact with the tread portion of the tire 8, the pivoted or base portions of the traction members 1, are provided with swinging latching or locking members 12, pivoted between suitable lugs $1^a$, of the traction members, each of said swinging latching or locking members, in the present instance, being provided with a longitudinally movable block $12^a$, slidably mounted and carried by guide pins $12^b$, and operating against the resistance of springs surrounding said guide pins. When the traction member 1, is in contact with the tire 8, the same will be removably and resiliently held in contact therewith through the medium of the latching member 12, the block $12^a$, being seated in an undercut opening or recess 13, in the supporting member or clip 11.

As a means for swinging the supporting member or clip 11, laterally, whereby the hinged or pivoted traction member 1, after being released and swung out of contact with the tire by the release of the latching member 12, may be carried or put up along the wheel felly 3, and secured in such position, the supporting member or clip 11, is secured by means of an attaching bolt 14, passing through the supporting ring 2, and as a means for stopping and holding the supporting member or clip 11, in folded position, as indicated in Fig. 1, of the drawings, the base of the clip or supporting member 11, may be provided with a lug or projection 11ª, adapted to come into engagement with a stop lug 2ª, on the supporting ring, in which position the traction member may surround and contact with the adjacent spoke 15, of the wheel as illustrated in Fig. 1, of the drawings.

It will be observed that by reason of the above described construction the tire traction members 1, are permitted to have a combined radial and transverse motion on the pivot bolts 9, as well as a limited canting or circumferential movement with respect to the tread portion of the tire by reason of the movement of the supporting clips 11, on the attaching bolts 14, carried by the supporting ring 2, and that the latter, together with the attached tire traction members are permitted to have a limited creeping or circumferential movement with respect to the tire by reason of the creeping or slipping of the inner periphery of the supporting ring 2, in the recess portion of the lugs 5, of the spoke clamps 4, these various adjustments being of importance in meeting the various exigencies of actual service, as for example,—the various concussions of the tire and tire traction members in passing over or striking obstacles and the deflation or partial deflation of the tire while the wheel is in motion.

From the foregoing description, taken in connection with the accompanying drawings, the operation and advantages of my invention will be readily understood.

Having thus described one of the embodiments of my invention, what I claim and desire to secure by Letters Patent is,—

1. In an anti-skidding device, a supporting ring, bearing clips pivoted at one side of the latter, and tire traction members transversely pivoted in said supporting clips.

2. An anti-skidding device, comprising a supporting ring, means for slidably connecting the latter at one side of the wheel, and a plurality of curved tire traction lever members pivoted transversely and circumferentially on said supporting ring.

3. In an anti-skidding device for wheel tires, a bearing member pivotally connected at one side of the wheel, and a tire traction member pivotally carried by said bearing member transversely to the axis of movement of said bearing member whereby said tire traction member may be moved longitudinally and transversely with respect to said tire.

4. An anti-skidding device for wheel tires, comprising a supporting ring, a plurality of spoke clamps detachably connected to said supporting ring, a plurality of bearing clips secured to said supporting ring and adapted to be folded on one side thereof, a plurality of tire traction members pivotally mounted in said bearing clips and adapted to extend over the tread portion of the tire, and means for securing said tire traction members in contact with said tire.

In testimony whereof I have affixed my signature in presence of two witnesses.

HERMAN W. MAURER.

Witnesses:
W. S. SNYDER,
O. C. BILLMAN.